United States Patent [19]

Edelsohn

[11] 3,924,341
[45] Dec. 9, 1975

[54] DOPPLER MICROWAVE LANDING SYSTEM SIGNAL SIMULATOR

[75] Inventor: Henry Edelsohn, Woodland Hills, Calif.

[73] Assignee: International Telephone & Telegraph Corporation, New York, N.Y.

[22] Filed: June 17, 1974

[21] Appl. No.: 480,006

[52] U.S. Cl. ................................ 35/10.4; 343/17.7
[51] Int. Cl.² ........................................... G01S 7/40
[58] Field of Search .................... 343/17.7; 35/10.4

[56] References Cited
UNITED STATES PATENTS

| 3,500,407 | 3/1970 | Thompson | 35/10.4 |
| 3,573,339 | 4/1971 | Flower et al. | 35/10.4 |
| 3,732,568 | 5/1973 | O'Mary et al. | 35/10.4 |
| 3,761,825 | 9/1973 | Hill | 343/17.7 |

Primary Examiner—Maynard R. Wilbur
Assistant Examiner—G. E. Montone
Attorney, Agent, or Firm—William T. O'Neil

[57] ABSTRACT

A signal simulator for artificially providing the Doppler-type signals as they would be sensed by a receiver at any point within the coverage volume of a Doppler-type air navigation beacon. A plurality of voltage controlled phase shifters providing instantaneous phase shifts precisely controlled by a digital programmer, are employed. The device is capable of simulating the complex Doppler Microwave Landing System transmitted beacon signal at any point within the coverage volume for either the azimuth or elevation coordinate functions, and for this purpose, generates a direct commutated signal, a multipath signal of independently controlled Doppler frequency, and reference signals both direct and reflected. The device is particularly useful for bench testing of the airborne Doppler-type navigation equipment normally used with the ground Doppler Microwave Landing System beacon transmitters.

10 Claims, 3 Drawing Figures

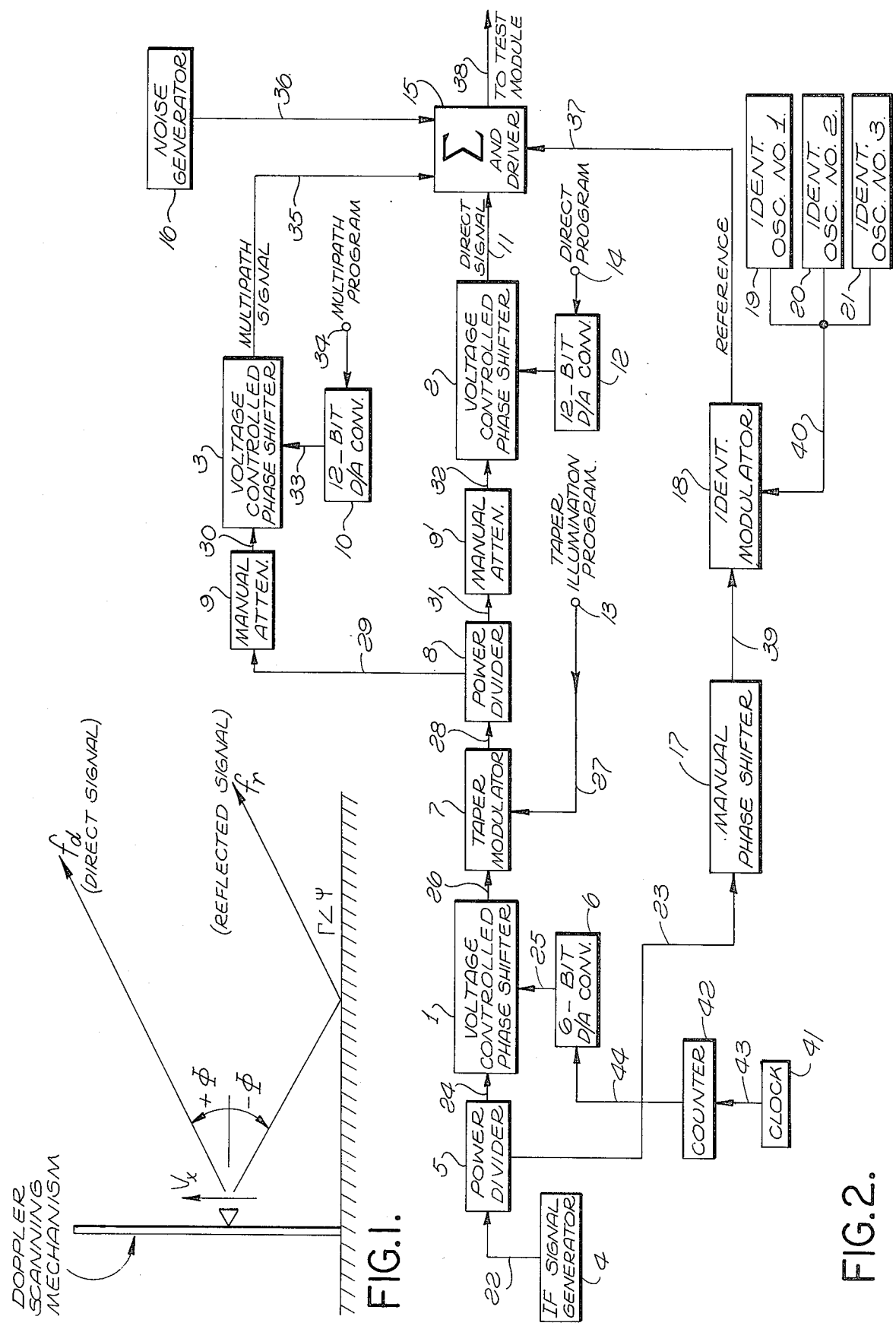

DOPPLER MICROWAVE LANDING SYSTEM SIGNAL SIMULATOR

BACKGROUND OF THE INVENTION

1. Field of the Invention

The present invention relates to Doppler navigation system devices, and more particularly, to apparatus for simulating the signals generated by a typical Doppler landing system ground beacon as sensed by receiver at any point within the coverage volume of the system ground beacon equipment.

2. Description of the Prior Art

Recent developments in the field of air navigation aids, and especially electronic air navigation aids in the terminal areas, include the so-called Doppler navigation system. Basically, these systems radiate a first frequency successively from each antenna element of a vertical or horizontal array (both vertical and horizontal arrays would actually be used in a practical glideslope and localizer system) thereby simulating a constant velocity moving signal source. A sequential selection according to a predetermined program of one radiating element at a time in such an array (usually a linear array) is referred to as "commutation". A reference or second frequency is also radiated substantially omnidirectionally, and a remote receiving station, such as a receiver on an aircraft on landing approach, receives these radiated frequencies and electronically computes its azimuth and/or elevation (localizer and glideslope) angles, with respect to predetermined array normals in space. The commutation produces the effect of Doppler-shift with respect to the reference signal and the angular deviation of the said remote station is a mathematical function of Doppler signal frequency.

The manner in which this mathematical function describes the angle deviation can be simple understood by realizing that a remote station in line with the series of elements in the commutated array, would observe a maximum Doppler-shift as a result of commutation of the ground station (ground beacon) antenna, whereas an aircraft along a normal to such an array would experience zero Doppler-shift and for all other angles ($\phi$),
$$f_d = (f_{max})(\sin\phi).$$

Such systems are described in the literature, including the patent literature. A basic system of the type is described in U.S. Pat. No. 3,626,419 and also in the periodical "Electrical Communication", Vol. 46 (1971) No. 4, Pgs. 253–270. Various other aspects and variations are described, for example, in U.S. Pat. Nos. 3,633,204 and 3,670,338.

In view of extensive development of Doppler microwave landing system equipment, there is a need for a signal simulator which will permit the testing of airborne equipment realistically, i.e., one capable of simulating the complex Doppler signal at any point within the coverage volume for either azimuth or elevation, without elaborate and expensive flight testing. Such a device must be capable of generating the direct commutated signal, any number of multipath signals with independent Doppler frequencies and reference signals both direct and reflected.

In view of the aforementioned need, the present invention offers a unique device for the purpose. The manner in which the device of the invention fulfills requirements will be understood as this description proceeds.

SUMMARY OF THE INVENTION

The device of the present invention essentially generates the simulated commutated array signal through the use of a plurality of voltage controlled phase shifters whose instantaneous phase shifts are a function of A/D voltages which are precisely controlled by a digital programmer. These phase shifters, which simulate the direct and reflected signals are controlled by a twelve bit digital-to-analog converter, while the phase shifter used to generate the off-set frequency is controlled by a five-bit digital-to-analog converter.

A digital programmer provides the timing and voltage levels necessary to generate signals characteristic of a given antenna at a given angle with respect to a normal of a said antenna array. Front panel switches select the number of antenna elements in a given array to be simulated (aperture length), the dwell time per element which is related to Doppler sensitivity, the number of scans per frame, and the observer and multipath angles. Controls may also be provided to vary the attenuation of the reflected signal and the initial phase. A switch is provided to choose simulation of unidirectional or bidirectional scanning. The direct signal, the reflected signal, and the reference are combined in a summing network to form an output signal. A noise source may also be introduced at the summing network to facilitate checking of the degradation of system performance as a function of signal-to-noise ratio.

The simulator according to the invention, faithfully reproduces Doppler-type ground beacon signals as aforementioned, and can be utilized in the investigation of the Doppler signal format and in the determination of the accuracy of particular signal processing techniques employed at the remote (airborne) receiver. The simulator programmer, by setting up the initial condition through a set of switches, can be made to generate signals characteristic of various antenna apertures. Those functions facilitate airborne equipment development, however, the present invention is also useful as an airborne receiver test and calibration set, capable of simulating angles with resolution on the order of 0.02°.

BRIEF DESCRIPTION OF THE DRAWINGS

FIG. 1 is a diagram illustrating direct and reflected signals from a vertically oriented (elevation measuring) Doppler array.

FIG. 2 is a structural and functional block diagram of a Doppler simulator in accordance with the present invention.

DESCRIPTION OF THE PREFERRED EMBODIMENT

Figure 3:
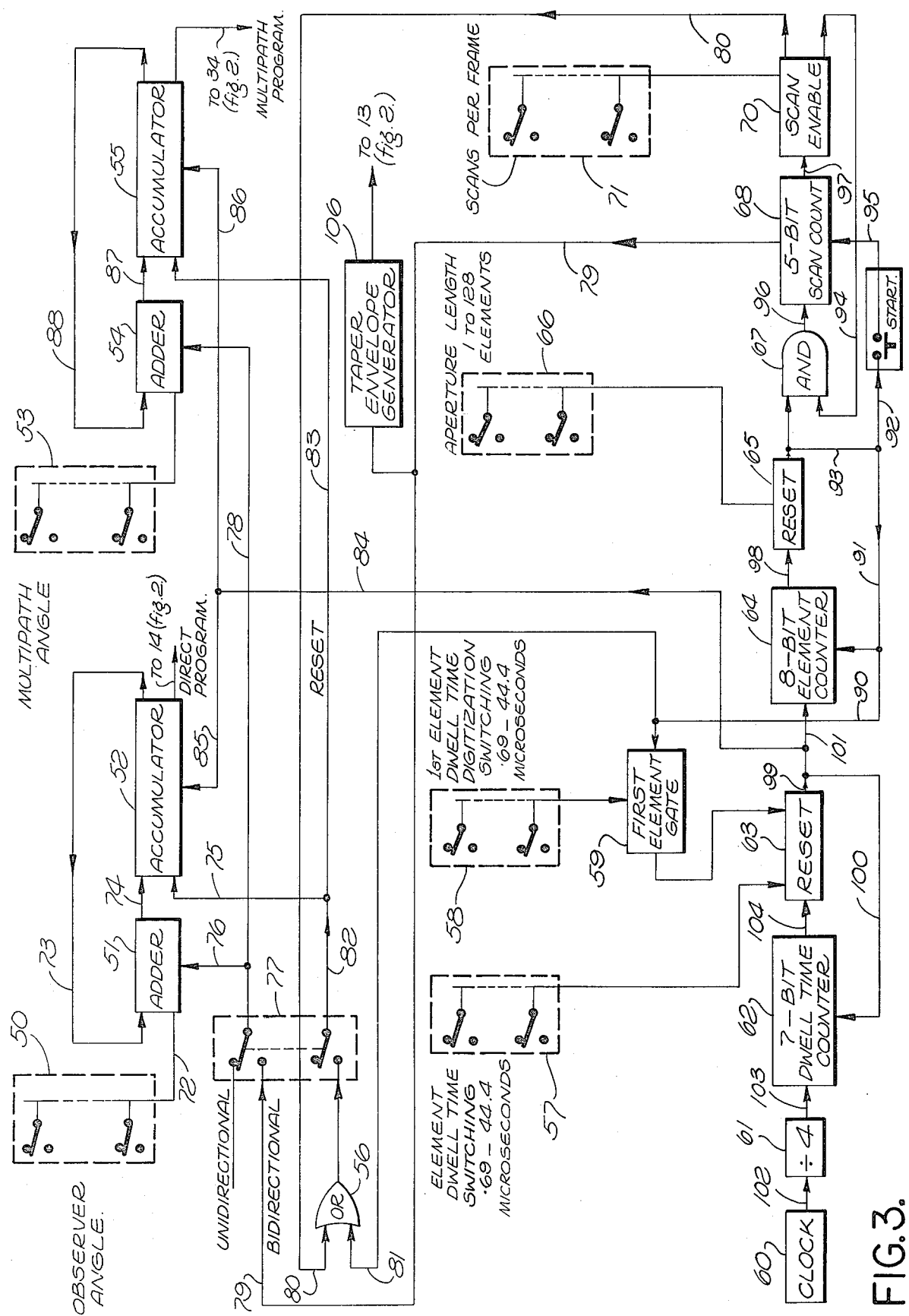
FIG. 3 is a simulator programmer according to the invention, for use in connection with the configuration of FIG. 2.

At the outset, it is useful to briefly discuss some of the parameters and characteristics of the realistic signal transmission format encountered with Doppler beacon installations of the type with which the present invention deals.

The Doppler Beacon signal in space is to be understood to be generated by a frequency source ($f$) as it moves or is switched along a linear path at a velocity $V_x$. In case of the elevation antenna, the signal, observed at an angle $\phi$, for one scan across the antenna, as shown in FIG. 1, is composed of a direct signal $f_d$ and a reflected signal $f_r$, and is given by the following equations:

$$G(\phi, t) = A(t) \exp i(2\pi f_d t) + B \exp i(2\pi f_r t + \psi)$$

where $$f_d = f\left(1 + \frac{V_x}{C}\sin\phi\right)$$

$$f_r = f\left(1 - \frac{V_x}{C}\sin\phi\right)$$

$A(t)$=Amplitude of the radiated signal
$B$=Amplitude of the reflected signal
$\psi$=Phase difference between the direct and reflected signals The azimuth guidance signal does not exhibit a predictable source of reflections as is the case for elevation, but the azimuth signal may nevertheless be degraded by off-course reflectors, shadowing by objects between transmitter and receiver, and irregularities in the runway surface.

Because of the physical difficulties in implementing the linear motion of a frequency source having a velocity $V_x$, the Doppler frequency $f_d$ is obtained in practical beacon equipment by switching the frequency source ($f$) along a linear array of radiators. As the feed is commutated from element-to-element of the array, the frequency source moves with a velocity which is a function of the spacing of the antenna element (66 λ), the radiation dwell time of each element ($\Delta t$), and the observer angle $\phi$. This relationship is given by:

$$f_d = \frac{\Delta \lambda}{\Delta t}\sin\phi$$

For the receiver to extract the Doppler frequency, a reference frequency is required. This reference frequency is transmitted from the same site as the commutated signal and is derived from the same frequency source. Since both the direct and reference signals reach the receiver essentially by the same path, the drift of the frequency source and the Doppler frequency due to the receiver motion with respect to the transmitter antenna are cancelled out.

To allow for the unambiguous detection of positive and negative Doppler frequencies which encode angles to the left or right of the center of the runway in case of azimuth and angles above or below the center of the array for elevation, the commutated signal is offset from the reference by a fixed frequency $f_o$. In addition to making it possible to decode negative angles, the offset frequency also serves to enhance the receiver sensitivity about the zero angle.

Since Doppler beacons of the present type may utilize different scanning techniques, e.g., alternating scan in opposite senses along the array, as well as special scans in which the array is commutated only partially, (i.e., less than all the elements are excited during any one commutation cycle). Accordingly, the device of the present invention contains means for generating the multipath or reflected signals in a manner so as to preserve the sense of frequency source motion. This is also true regarding the sense of direct and ground reflected signals in the elevation situation. Under those circumstances, the ground reflected signal in elevation has a Doppler frequency equal, but opposite in sense, as compared to the direct signal. The reflections in the azimuth situation may have Doppler frequencies of the same or opposite sense, as compared to the direct signal. The simulator is capable of realistically simulating such conditions and, in addition, can provide phase and amplitude tapering, such as might be used to modify antenna illumination for the purpose of reducing spectrum sidelobes as compared with uniform illumination.

Referring now to FIG. 2, it is first noted that the device operates in the IF domain, for example, in the region of 30 MHz. Such an IF signal contains all the information which would normally be found in a realistic RF signal, since the down conversion in a Doppler navigation beacon receiver would normally be performed in a linear manner. Operation at IF makes it possible to accurately simulate the Doppler ground beacon signal with small and inexpensive components. The output of a simulator then is obviously connected to the IF signal channel of the module (Doppler navigation receiver equipment) to be tested.

Of course, there is no technical reason why the IF signal output of the device of the invention could not be up-converted to the radio frequency domain, if for some reason this were desirable. In that case, the simulated signals would be injected at the receiver antenna connection.

Referring specifically now to FIG. 2, the simulator itself will be described. Subsequently, a programmer, as illustrated in FIG. 3, will be described. That programmer provides a single predetermined program, i.e., one angle — one antenna type, etc. A suitable programmed general purpose computer would be capable of carrying the simulation a step farther. That is, a dynamic simulation could be effected by controlling the direct program input 14, the multipath input 34 and the taper illumination program at 13, in a typical manner according to the variation of receive signals at the airborne receiver as it changed position. Obviously, in a simulation, it is necessary for complete dynamic testing, to program the signals applied to the receiver in this way. The arrangement of FIG. 3 however, is capable of supplying the receiver (through the actual simulator of FIG. 2) with a discrete set of parameters representative of a predetermined condition. By manually controlling the parameters which the device of FIG. 3 is able to generate, it is, of course, possible to simulate any desired number of receiver positions and multipath situations.

It will be realized that in the actual physical situation, an airborne receiver detects both direct and multipath signals, each with Doppler components, whereas the so-called reference signal is received without Doppler components, except what Doppler is due to the aircraft's own movements, the latter being equal for both the commutated signal and reference and therefore having no affect on the angle computation.

Voltage controlled phase shifters 1, 2 and 3 function to produce this artificial or simulator Doppler effect. It is known that a physical analogy exists between controlled or "step-wise" phase shifting and the transmission path change caused by ground beacon array commutation.

It is also to be understood in connection with both FIGS. 2 and 3, that a different set of conditions is required for azimuth and elevation situations. Thus, FIGS. 2 and 3 constitute the manually operated hardware necessary for either azimuth or elevation simulation.

It should be noted at this point that the actual Doppler navigational equipment to be simulated by the device of the present invention employs a so-called "offset" frequency, this being the difference between the carrier frequency used to energize the commutated array and the signal radiated by the reference radiator. It is understood in this art, that this expedient makes it possible for the airborne equipment to make positive and negative Doppler determinations corresponding to positive and negative angles with respect to an array normal.

As previously indicated, the embodiment of the device described produces a carrier output in the IF domain, for example, 30 MHz by means of IF signal generator 4. From there, via lead 22, a power divider 5 splits the IF energy into two paths 23 and 24. Along the path 23, a manual phase shifter 17, for calibration or incidental adjustment, and an identify modulator are joined by a lead 39. The output of this identity modulator 18 constitutes the reference signal, per se, on lead 37 via which it is supplied to the summer and driver 15 for inclusion in the output of the device.

It is common for Doppler navigation airborne receiving equipment to respond to a modulation, or code, on the reference signal, in order to identify the ground beacon transmission as relevant to the azimuth or elevation function. Such identification may involve a single sub-carrier, phase modulation or multiple sub-carriers (tones): 19, 20 and 21 are examples of sub-carrier (tone) generators for that purpose.

Bearing in mind that the instrumentation of FIG. 2 is intended for a single predetermined program, it will be realized that the oscillators 19, 20 and 21 would be preset to provide whatever tone-coding was appropriate for the predetermined program of interest at the time.

Except for the identification modulation thus introduced through 18, the reference signal supplied on lead 37 to the summer and driver 15, is simply a power fraction of the output of IF signal generator 4.

Another output 24 of the power divider 5, provides IF signal energy to voltage controlled phase shifter 1. The function of this phase shifter 1 is the generation of the "offset" frequency itself. This offset frequency is 90KHz. To understand the mechanism of the generation of this offset frequency, note that a clock 60 having a pulse frequency of 5.76 MHz produces a uniform series of timing pulses on lead 43 which are counted by counter 42 to produce a linearly increasing count on lead 44. From there, a digital-to-analog converter 6, converts the count to a saw-tooth waveform on lead 25. The said saw-tooth waveform is the reciprocal of 90 KHz in duration, that is, approximately 11.1 microseconds. That waveform applied to phase shifter 1 may be though of as causing the generation of a single sideband, which is the said offset frequency.

It will be realized that if the counter 42 is constructed as an alternating up-down counter, both sidebands may be generated at 26, and this would be appropriate for a bi-directional array scan simulation.

Referring now to taper modulator 7, this element may be considered to be a controlled amplitude modulator responding to a taper illumination program applied at terminal 13 and to modulator 7, via lead 27. Thus, if a modulator amplitude controlling signal is applied at 13 and varies synchronously with respect to the direct program applied at terminal 14 (to be discussed hereinafter) the effect of an array taper can be simulated. This array tapering function has been employed in Doppler beacon equipment, so that the excitation of the end elements is substantially lower than the energization of those elements close to the center of the array during the commutation program. The purpose of such a taper is amelioration of the phase transient effect resulting from reset between array aperture scans. Proceeding from modulator output 28, another power divider 8 splits energy between outputs 29 and 31. Manual attenuators 9 and 9' control the relative amplitudes of these outputs respectively, producing outputs 30 and 32, which provide the voltage control phase shifters 3 and 2, respectively, with an IF domain signal at the said offset frequency. To terminal 14 there is applied a digital program which, when converted to analog form in digital-to-analog converter 12, provides a phase shift in 2, which is representative of commutation of the beacon array. In accordance with the particular construction of the program inserted at 14, it will be understood that bi-directional scan, alternating partial array scans and other types of Doppler array scanning programs, can be simulated. The direct signal program proceeding on lead 11 from 2, passes through the summer and driver 15 to the output lead 38, thereby simulating the beacon antenna output insofar as the direct commutation program signals are concerned. Considering now the energy at the offset frequency on lead 30, a comparable phase shifter 3 with digital-to-analog converter 10 receives a multipath program 34. This program differs from the direct signal program in that it generates a signal whose instantaneous phase is a function of the path length which the reflected signal is traveling and the angular position of the reflector. In this way, either the azimuth or elevation reflections inherent in a ground beacon installation system of the Doppler type can be realistically produced. The azimuth guidance signal will not exhibit a predictable source of reflections as in the case of elevation, the latter being essentially only a ground reflection problem. Thus, in elevation, one main reflection or multipath signal responding to the law of angle of incidence and reflection, is generated and arrives at a discretely later time at the airborne receiver, depending upon its geometric position with respect to the ground beacon antenna. See FIG. 1 for a graphic view of that situation. In azimuth, on the other hand, reflections from buildings, terrain features, etc., are quite variable in the realistic situation. Accordingly, the multipath program provided at 34 can synchronously provide a control for phase shifter 3, representative of any predetermined variation of reflections or multipaths for each discrete commutated element of the ground beacon antenna. That is, of course, descriptive of a given antenna at the ground beacon and a given position of the airborne receiver.

The so-called multipath signal 35 is also mixed in the summer and driver 15, and becomes a part of the output at 38 in the IF domain. The noise generator 16, which may be controllable as to spectrum and amplitude, can provide a signal on 36 which may be also added in 15 to provide the necessary signal environmental realism for evaluating the performance of the airborne receiver.

At this point it should be emphasized that the various program inputs as applied at 13, 14 and 34, may be programmed discretely (point-by-point), by means of a simulator programmer which may be as described in connection with FIG. 3. In order to simulate the fully dynamic situation (that is, one in which the aircraft receiver is continuously changing position) and thereby encountering different Dopplers and varying multipath signals, a general purpose computer may be employed. Thus, the various program inputs on FIG. 2 as aforesaid, may be programmed not only repetitively as required by the Doppler commutation scan of the ground beacon antenna, but also realistically as the airborne receiver actually changes position.

Referring not to FIG. 3, a typical "discrete point" simulator will be described.

It will first be noted that the direct program output from the accumulator 52 is a signal which provides an input to block 12 of FIG. 1 at input 14. Similarly, the multipath program is outputed from accumulator 55 and this is the signal received at input 34 to block 10 of FIG. 1. The taper illumination program input terminal 13 on FIG. 2 is provided by the taper envelope generator 106 on FIG. 3. This element 106 is essentially a periodic function generator providing a symmetrically shaped Gaussian (or similar) waveform, having a duration equal to the scan aperture signal produced by 68 and extant on line 79. The instrumentation of a device, such as 106, is readily accomplished by those skilled in this art.

Basically, it may be said that the programmer of FIG. 3 provides the artificial commutating signals for direct and multipath programs, these producing appropriate phase shift programs from phase shifters 2 and 3 of FIG. 1, to simulate predetermined variable observer angle and multipath angle. The programmer of FIG. 3 also provides variable element dwell time within the commutation program, variable first element dwell time (digitization) and also aperture length and scan limit variation.

The so-called "digitization" amounts to incrementing of phase modulation of the 90 KHz offset signal. The direct signal is "digitized", this being accomplished by varying the first element dwell time resulting in an incremental change of RF phase of the offset frequency, which is the carrier for the commutator direct signal. In this way, the ending phase values detected by the receiver under test are treated in the same manner as the actual ground Doppler beacon treats it, in that large phase changes which are likely to cause errors in some processors do not occur at some specific angles at all times but are equally distributed throughout the coverage region during a small number of scans. This technique, referred to as "digitization", is one which is known in connection with Doppler beacon equipment.

Beginning now with the clock 60, which would preferably be a crystal type clock operating at a typical frequency of 5.76 MHz, it will be noted that a divide-by-four circuit 61 is driven by clock 60 via lead 102. From there, via lead 103, a seven bit dwell-time counter 62 counts a number of the quarter frequency clock pulses on 103 until terminated by a reset feedback signal along path 100. Except for the variations effected by "digitization", the dwell time counter would make substantially the same count corresponding to the excitation of each successive ground beacon array radiator. The switch arrangement 57 symbolically represents control of the element dwell time for all except the first element dwell time. Accordingly, the reset device is constructed to recognize a certain predetermined count as controlled from 57 and to terminate the count of 62 via the signal on lead 99 fed along path 100 to stop the count and reset 62. In connection with the first element dwell time, a first element gate 59, which is energized by a scan-start signal on leads 90 and/or 79 takes over the resetting of 63 for the first element dwell time only. This switch arrangement 58 symbolically represents the adjustment of first element dwell time (digitization). In a typical embodiment, consistent with the characteristics of Doppler beacon equipment, the element dwell time, including the first element dwell time, might be adjustable over a range of 0.69 to 44.4 microseconds. The output of reset device 63, containing the individual element dwell time count, follows the paths 101 and 84, in parallel. The eight bit element (aperture counter) counter 64, which feeds the reset device 65, via path 98, serves as a counting arrangement in which the count of 64 is terminated via a feedback signal from 65 along paths 93 and 91.

The switching arrangement 66 symbolically represents the control of the reset device 65 to permit an aperture length (i.e., the number of elements excited per scan) from 1 to 128, in a representative situation. Accordingly, the output of reset device 65, going to AND circuit 67, represents the appropriate number of incremental phase shifts called for at terminals 11 and 35 on FIG. 2, corresponding to the number of elements selected by 66.

The start switch 69 merely serves to reset the output at 79 to the beginning of an aperture cycle. Thus, AND circuit 67 can only provide an output on lead 96 to permit 68 to count when signals are present both on leads 93 and 94, the signal on 94 essentially being an ON switch or enable signal existing for at least one frame or scan aperture time. Switch 71 is symbolic of the control of the duration of the signal on 94 as generated by 70, thus the "scans per frame" are determined. In the usual Doppler beacon arrangement, there would be a predetermined number of scans or repetitions over the same aperture program before the function of the system is switched over to another coordinate, for example, switching from azimuth to elevation, or vice versa. An additional "scans per frame" enable signal is supplied on lead 80 from 70, and either it, or a signal from start switch 69, can operate through OR circuit 56 via leads 80 or 81, respectively, to provide a reset signal on lead 82, which divides into lead 75 and 83 to the accumulators 52 and 55, respectively. The unidirectional/bidirectional switch is represented at 77. Through this switch, the adder/accumulator circuits 51, 52, 54 and 55, for the direct and multipath programs respectively, are restarted via lead 79 and the signal on 76 and 78 for bidirectional scanning. That is, the adder/accumulator counts up or down on each of the outputs to 14 and 34 of FIG. 2, constituting the direct and multipath programs, respectively. Recycling for bidirectional scan is accomplished through the OR circuit 56 as aforementioned into leads 75 and 83, whereas the actual count proceeds along lead 84 indirectly from the crystal clock 60 and its subsequent circuits to lead 99.

The observer angle switch is symbolically represented at 50, connected by lead 72 to adder 51. The effect of this control is to determine the extent of the count passed on at the direct program output. That is, in the physical situation the Doppler component observed is either more or less, depending upon the receiver's angle. Accordingly, for the same element dwell time aperture length and scans per frame, the count can be more or less at direct and multipath programs, depending upon observer angle selected. The multipath angle selector 53 accomplishes a similar thing as it connects via lead 89 to adder 54.

Thus, it will be seen adder 51 connected via lead 74 to accumulator 52, and enclosed by feedback loop 73 accomplishes the direct program digital code required into 14 of FIG. 2. Adder 54 connected by lead 87 to accumulator 55 and including feedback path 88, provides a comparable circuitry for the multipath program, as supplied to 34 on FIG. 2. The multipath angle selected at 53 is effected in the same manner circuitwise as is the primary observer angle as selected at 50.

What is claimed is:

1. A device for simulating the signal from a Doppler type, commutated antenna array ground beacon as received at a predetermined remote receiving point, comprising:
    a signal source operating at a predetermined radio frequency;
    digital clock means for producing a continuous succession of timing pulses;
    a first controllable radio frequency phase shifter responsive to said signal source and having a control input;
    first means including a digital counter and a first D/A converter responsive to said counter, said counter being responsive to said clock means, to generate and apply to said first controllable phase shifter control input, a periodic sawtooth signal, thereby to produce a radio frequency sideband spaced a predetermined amount in frequency from said signal source;
    second and third controllable radio frequency phase shifters each responsive to said sideband at the output of said first controllable phase shifter, and each having a control input;
    programmer means for generating and applying to said second and third controllable phase shifter control inputs, signals representative of phase shift programs corresponding to the direct and multipath signal phase variations during commutation of a ground beacon antenna simulated, respectively;
    and a summer circuit responsive to the outputs of said second and third controlled phase shifters and to said signal source to produce a composite signal including said direct and multipath signals and a reference signal, respectively.

2. Apparatus according to claim 1 in which said programming means includes digital circuits for generating separate direct and multipath digital programming signals, said programming signals each comprising a substantially fixed number during the simulated dwell time corresponding to each element of said commutated antenna.

3. Apparatus according to claim 2 including means associated with said digital circuits for separately controlling the duration of the digital number corresponding to the first element dwell time in each commutation cycle for both said direct and multipath signals.

4. Apparatus according to claim 3 including first additional means within said digital circuits, responsive to manual predetermination, for selecting the number of said digital numbers, each corresponding to an element dwell time, are included in each of said commutation cycles.

5. Apparatus according to claim 4 including second additional means within said digital circuits, responsive to manual predetermination, for selecting the simulated directional sense of scan, said means providing increasing digital numbers for successive dwell times for one scan sense and decreasing digital numbers for successive dwell times for the other scan sense.

6. Apparatus according to claim 5 including third additional means responsive to manual preselection, for causing successive ones of said scan cycles to produce successive scans in alternating senses.

7. Apparatus according to claim 6 including means responsive to separate manual preselection, for controlling the difference between successive digital programming signals for each of said direct and multipath programming signals, to simulate predetermined direct and multipath angles, respectively.

8. Apparatus according to claim 1 including a noise source connected to said summer circuit to provide composite signal realism.

9. Apparatus according to claim 1 in which said signal source to generate said sideband substantially at the frequency of the IF circuits of a receiver to be tested by said simulating device.

10. Apparatus according to claim 2 including means responsive to separate manual preselection, for controlling the difference between successive digital programming signals for each of said direct and multipath programming signals, to simulate predetermined direct and multipath angles, respectively.

* * * * *